US011003851B2

United States Patent
Wahl et al.

(10) Patent No.: US 11,003,851 B2
(45) Date of Patent: May 11, 2021

(54) SYSTEMS, METHODS AND COMPUTER PROGRAMS FOR CUSTOMIZED NATURAL LANGUAGE PROCESSING AND SEARCHING BASED ON TECHNICAL TERMS WITHIN ELECTRONIC DOCUMENTS

(71) Applicant: LIFE TECHNOLOGIES CORPORATION, Carlsbad, CA (US)

(72) Inventors: Aron Wahl, Los Angeles, CA (US); Matthew Murray, Los Angeles, CA (US); Austin Beer, Los Angeles, CA (US); Emily Wengert, Brooklyn, NY (US); Heiko Waechter, Brooklyn, NY (US); Matt Loomis, Los Angeles, CA (US); Namit Joshi, Los Angeles, CA (US)

(73) Assignee: Life Technologies Corporation, Carlsbad, CA (US)

( * ) Notice: Subject to any disclaimer, the term of this patent is extended or adjusted under 35 U.S.C. 154(b) by 154 days.

(21) Appl. No.: 16/270,508

(22) Filed: Feb. 7, 2019

(65) Prior Publication Data

US 2019/0243893 A1 Aug. 8, 2019

Related U.S. Application Data

(60) Provisional application No. 62/627,999, filed on Feb. 8, 2018.

(51) Int. Cl.
*G06F 40/211* (2020.01)
*G06Q 30/06* (2012.01)
(Continued)

(52) U.S. Cl.
CPC .......... *G06F 40/211* (2020.01); *G06F 16/313* (2019.01); *G06F 16/3329* (2019.01);
(Continued)

(58) Field of Classification Search
CPC .. G06F 40/211; G06F 16/313; G06F 16/3329; G06F 40/289; G06F 40/295; G06Q 30/0631
(Continued)

(56) References Cited

U.S. PATENT DOCUMENTS

| | | | |
|---|---|---|---|
| 9,396,179 B2* | 7/2016 | Stavrianou | G06F 40/30 |
| 2009/0192954 A1* | 7/2009 | Katukuri | G06F 19/324 |
| | | | 706/11 |
| 2013/0317994 A1* | 11/2013 | Tran | G06Q 50/184 |
| | | | 705/310 |

OTHER PUBLICATIONS

Extended European Search Report issued in European Patent Application No. 19155932.7 dated Jun. 25, 2019, 7 pages.

(Continued)

*Primary Examiner* — Quynh H Nguyen
(74) *Attorney, Agent, or Firm* — Mauriel Kapouytian Woods LLP; Liang Huang; Michael Mauriel

(57) ABSTRACT

Methods, systems, and computer readable media concern natural language processing and searching for identifying biological products in an electronic document. The method includes extracting, from the electronic document, a candidate text phrase representing a potential biological product reference in the electronic document and parsing the candidate text phrase into a syntactic structure including one or more terms. The method includes tagging each of the one or more terms in the syntactic structure with a vocabulary tag. The vocabulary tag represents a technical meaning of a term in the potential biological product reference. The method includes calculating a total score for the candidate text phrase based on relative tag scores associated with each vocabulary tag for the one or more terms. The method includes classifying the candidate text phrase as a biological
(Continued)

product reference and includes searching a database for one or more product entries based on the biological product references.

20 Claims, 9 Drawing Sheets

(51) Int. Cl.
  *G06F 16/332*  (2019.01)
  *G06F 16/31*  (2019.01)
  *G06F 40/289*  (2020.01)
  *G06F 40/295*  (2020.01)

(52) U.S. Cl.
  CPC .......... *G06F 40/289* (2020.01); *G06F 40/295* (2020.01); *G06Q 30/0631* (2013.01)

(58) Field of Classification Search
  USPC .............................................................. 704/9
  See application file for complete search history.

(56) References Cited

OTHER PUBLICATIONS

Krauthammer, M. et al., "Term identification in the biomedical literature," Journal of Biomedical informatics, vol. 37, No. 6, Dec. 2004, pp. 512-526.

Gaizauskas, R. et al., "Term Recognition and Classification in Biological Science Journal Articles," University of Sheffield, 2000, 8 pages.

Aronson, A., "Effective mapping of biomedical text to the UMLS Metathesaurus: the MetaMap program," Proceedings/AMIA Symposium, 2001, pp. 17-21.

Franzen, K. et al., "Protein names and how to find them," International Journal of Medical Informatics, vol. 67, No. 1-3, Dec. 2002, pp. 49-61.

\* cited by examiner

SYSTEMS, METHODS AND COMPUTER PROGRAMS FOR CUSTOMIZED NATURAL LANGUAGE PROCESSING AND SEARCHING BASED ON TECHNICAL TERMS WITHIN ELECTRONIC DOCUMENTS

TECHNICAL FIELD

This application generally relates to methods, systems, and computer readable media for searching for terms in a document.

INTRODUCTION

Currently, when a scientist or other reader is viewing or reading a document such as a scientific paper in a technical field, such as biology, the reader may desire to identify various scientific references in the document and potential products associated with the references. For instance, the reader may be viewing a scientific paper that concerns the use of specific antibodies, and the reader may desire to identify the antibody references in the document and also products associated with the antibody references. The reader, however, may not be able to easily identify the references. For example, in the scientific field, differing documents often use different terminology in describing the same biological product references, such as antibody references for example. For instance, different authors may utilize different terminology when describing an antibody reference. Also, for instance, the different purveyors of biological products may utilize different names and terminology for their products. Furthermore, authors may accidently alter, misidentify or combine different terminology in referring to products used within a study based on the differences in referring to the same or similar biological products in the technical field and/or by different purveyors of products within the technical field. As such, it may be difficult for a reader or other recipient of the information in the document to properly identify the references either manually or automatically.

SUMMARY

Exemplary embodiments of the present disclosure may solve one or more of the above-mentioned problems and/or may demonstrate one or more of the above-mentioned desirable features. Other features and/or advantages may become apparent from the description that follows.

In one exemplary embodiment, a method concerns natural language processing and searching for identifying biological products in an electronic document. The method includes extracting, from the electronic document, a candidate text phrase representing a potential biological product reference in the electronic document. The method also includes parsing the candidate text phrase into a syntactic structure including one or more terms. The parsing filters the one or more terms in the syntactic structure according to a syntactic role of the one or more terms relative to a technical field associated with the potential biological product reference. Further, the method includes tagging each of the one or more terms in the syntactic structure with a vocabulary tag. The vocabulary tag represents a technical meaning of a term in the potential biological product reference. The method additionally includes calculating a total score for the candidate text phrase based on relative tag scores associated with each vocabulary tag for the one or more terms. The relative tag scores represent a relative confidence strength of each vocabulary tag in the potential biological product reference. The method also includes classifying the candidate text phrase as a biological product reference based on the total score exceeding a threshold. Additionally, the method includes searching a database for one or more product entries based on the biological product references, with these one or more product entries then retrieved from the database for potential use in providing one or more product recommendations for the biological product reference.

In another exemplary embodiment, a non-transitory computer readable medium stores instructions for performing a method of natural language processing and searching for identifying biological products in an electronic document. The method includes extracting, from the electronic document, a candidate text phrase representing a potential biological product reference in the electronic document. The method also includes parsing the candidate text phrase into a syntactic structure including one or more terms. The parsing filters the one or more terms in the syntactic structure according to a syntactic role of the one or more terms relative to a technical field associated with the potential biological product reference. Further, the method includes tagging each of the one or more terms in the syntactic structure with a vocabulary tag. The vocabulary tag represents a technical meaning of a term in the potential biological product reference. The method additionally includes calculating a total score for the candidate text phrase based on relative tag scores associated with each vocabulary tag for the one or more terms. The relative tag scores represent a relative confidence strength of each vocabulary tag in the potential biological product reference. The method also includes classifying the candidate text phrase as a biological product reference based on the total score exceeding a threshold. Additionally, the method includes searching a database for one or more product entries based on the biological product references, with these one or more product entries then retrieved from the database for potential use in providing one or more product recommendations for the biological product reference.

In another exemplary embodiment, a system includes one or more memory devices storing instructions, and one or more processors coupled to the one or more memory devices and configured to execute the instruction to perform a method of natural language processing and searching for identifying biological products in an electronic document. The method includes extracting, from the electronic document, a candidate text phrase representing a potential biological product reference in the electronic document. The method also includes parsing the candidate text phrase into a syntactic structure including one or more terms. The parsing filters the one or more terms in the syntactic structure according to a syntactic role of the one or more terms relative to a technical field associated with the potential biological product reference. Further, the method includes tagging each of the one or more terms in the syntactic structure with a vocabulary tag. The vocabulary tag represents a technical meaning of a term in the potential biological product reference. The method additionally includes calculating a total score for the candidate text phrase based on relative tag scores associated with each vocabulary tag for the one or more terms. The relative tag scores represent a relative confidence strength of each vocabulary tag in the potential biological product reference. The method also includes classifying the candidate text phrase as a biological product reference based on the total score exceeding a threshold. Additionally, the method includes searching a database for one or more product entries based on the biological product references with these one or more product entries then retrieved from the database for potential use in providing one or more product recommendations for the biological product reference.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present teachings and together with the description serve to explain certain principles and operation.

DETAILED DESCRIPTION OF EXEMPLARY EMBODIMENTS

The present disclosure concerns a new and novel process and system for identifying biological product references, e.g., antibody product references, in electronic documents, such as, for example, scientific papers, journal or trade articles, and other documents containing such product references. Based on the identified references, the process and system provide targeted product recommendations corresponding to the identified biological product references. In various exemplary embodiments, a search engine performs customized natural language processing to identify biological product references regardless of the format and terminology used in the input search criteria.

The natural language processing includes customized part-of-speech identification that addresses misidentified parts-of-speech that are specific to the technical field of the biological products. For example, the natural language processor identifies relevant characters in a candidate biological product reference misidentified as stopwords or standard text symbols, field specific terms in a candidate biological product reference misidentified as nouns/adjectives, and/or relevant conjunctions in a candidate biological product reference misidentified as standard language conjunctions. Additionally, the natural language processor includes customized sentence processing that considers misidentified sentence structure. For example, the natural language processor identifies noun phrases misidentified due to parentheses or other symbols and/or multiple biological product references mis-grouped in a phrase or fragment.

The search engine also includes customized vocabulary tagging tailored to the technical field of the biological product. For example, the search engine tags terms according to a technical meaning relative to the biological product reference. The search engine also includes customized confidence scoring for a candidate biological product reference. For example, each term in a phrase is given a score based on associated vocabulary tags. Likewise, scores for each tag customized for the technical field of the biological product and scores for each tag indicates relative confidence strength in a given phrase. The search engine identifies candidate biological product reference as a biological product reference if the confidence score exceeds a threshold.

For identified biological product references, biological product recommendations are determined and presented to the user for possible purchase. For example, the identified biological product references in the electronic document can be replaced or supplemented with a link that presents details on the product recommendation and a redirect to and/or other information to facilitate purchase the product.

Figure 1:
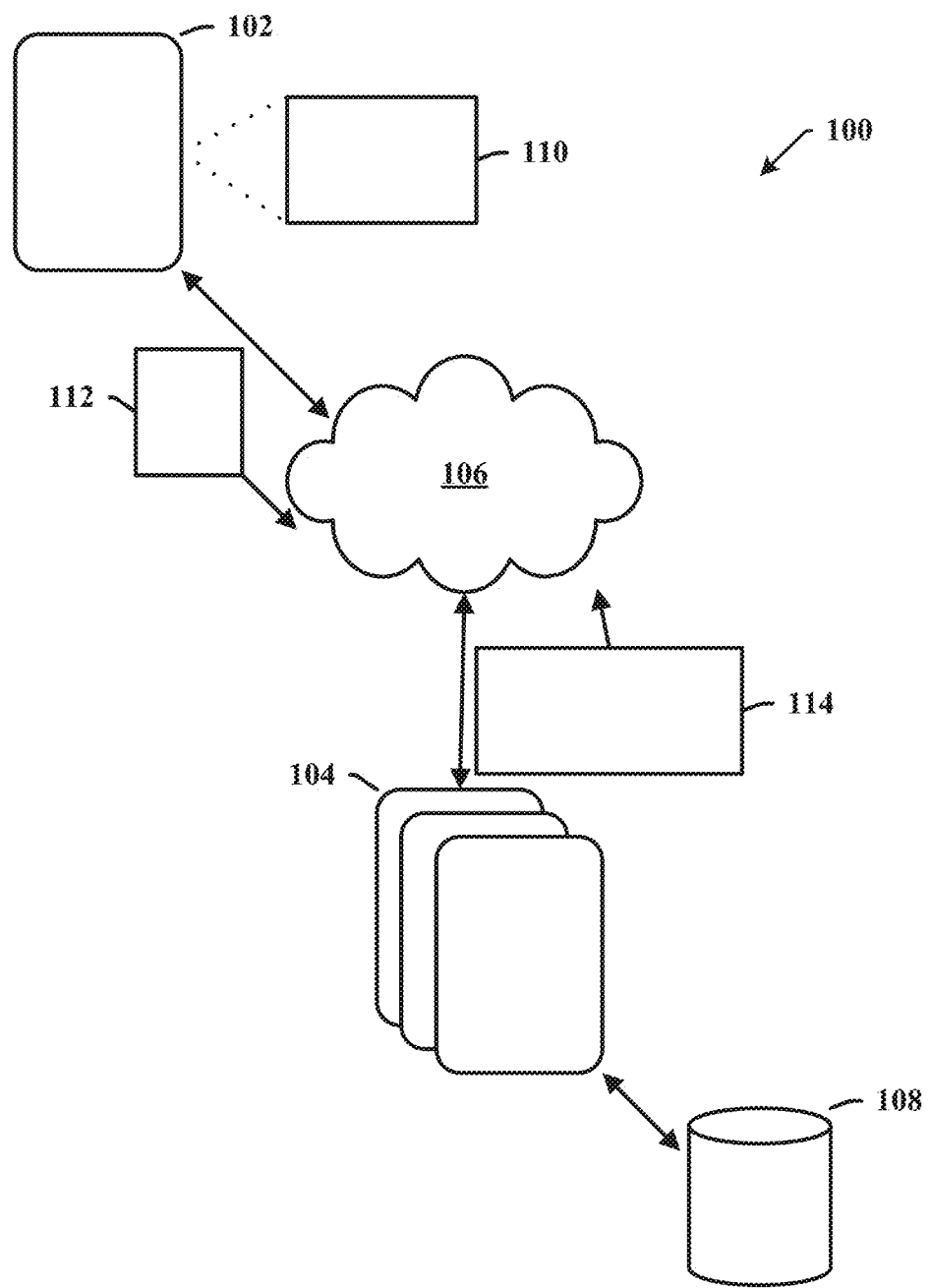
FIG. 1 depicts a schematic illustration of a network environment, according to various exemplary embodiments of the present disclosure.

FIG. 1 is a schematic illustration of a network environment 100, according to various exemplary embodiments of the present disclosure. While the network environment 100 illustrates various components, one skilled in the art would realize that additional components can be added and/or existing components can be removed.

As illustrated in FIG. 1, the network environment 100 includes a computer device 102 and one or more server computers 104 communicating via a network 106. The server computers 104 are coupled to one or more databases 108. In embodiments, a document 110 may be provided at the computer device 102. For example, the document 110 can be made accessible at the computer device 102 for viewing, accessing, editing, scanning, etc. For various reasons, it may be desirable to identify references that are contained in the document 110. For example, the document 110 can be a scientific paper in a technical field, such as biology, and a user accessing the document 110 at computer device 102 may desire to identify various scientific references in the document 110 and potential products associated with the references. For instance, the user may be viewing a document 110 that concerns reference antibodies, and the user may desire to identify the antibody references in the document 110 and products associated with the antibody references. The user, however, may not be able to easily identify the references. For example, in the scientific field, differing documents, such as differing documents 110, often use different terminology in describing the same or very similar biological product references, such as antibody references for example. As such, it may be difficult for a user or other recipient of the information in the document to properly identify the references either manually or automatically.

In various exemplary embodiments, the network environment 100 can provide a process for automatically identifying references in the document 110. As described further below, the network environment 100 provides a search environment in which the references in the document 110 can be automatically identified regardless of the terminology used in the document 110. In the search environment, the text 112 on the document 110 can be extracted and transmitted to the server computers 104 of the network environment 100. Once received, the server computers 104 can parse the text 112 to identify the references contained in the text 112. Once identified, the server computers 104 can search the databases 108 for products associated with the references and provide details of those products at the computer device 102, for example to be accessed by a user contemporaneously or at a later date. The server computers 104 can transmit one or more product recommendations 114 to the computer device 102.

The computer device 102 can be any type of computing device for accessing and viewing the document 110. For example, the computer device 102 can include one or more server computers, one or more desktop computers, one or more laptop computer, one or more tablet computers, one or more mobile devices, and the like. In any example, the computer device 102 can include hardware resources (processors, memory, storage, etc.) and software resources (operating systems, application programs, etc.) to perform the processes and methods described herein.

The server computers 104 can be any type of computing device or system capable of performing the processes and methods described herein. In some embodiments, the server computers 104 can be physical computer systems. In this example, the server computers 104 can include hardware resources (processors, memory, storage, etc.) and software resources (operating systems, application programs, etc.) to perform the processes and methods described herein. In some embodiments, the server computers 104 can be implemented in virtual computer systems. In this example, the functionality of the server computer 104 and the databases 108 can be implemented in one or more cloud computer systems. The network 120 can be any type of network whether public or private.

Figure 2:
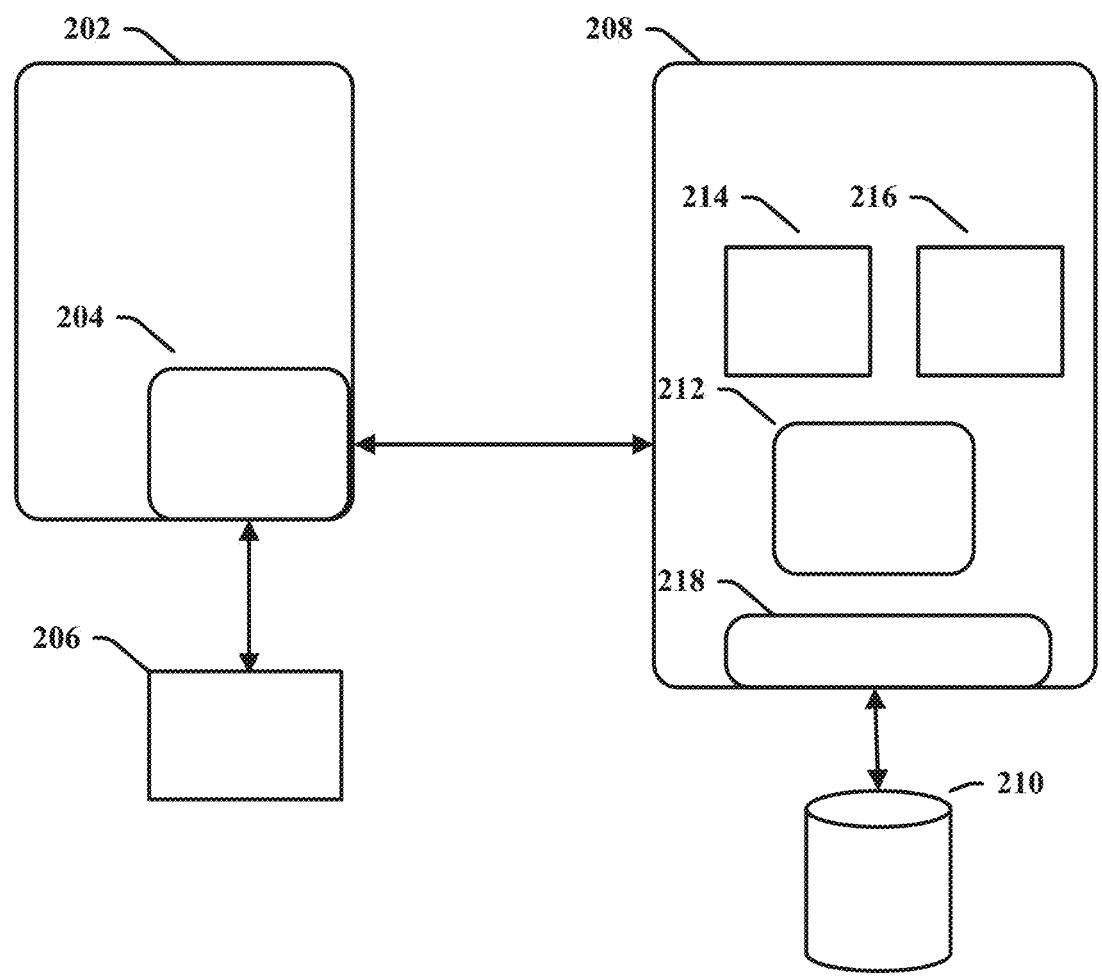
FIG. 2 depicts a block system diagram of a search environment, according to various exemplary embodiments of the present disclosure.

FIG. 2 illustrates a block diagram of a search environment 200, according to various embodiments of the present disclosure. While the search environment 200 illustrates various components, one skilled in the art will realize that additional components can be added and/or existing components can be removed.

As illustrated in FIG. 2, the search environment 200 includes a user application 202 with an application module 204. The user application 202 can be any type of user application that accesses, edits and displays a document, such as document 110 from FIG. 1. For example, the user application 202 can include a web browser, a document editor, an image viewer, and the like. The application module 204 can be configured to interface with the user application and perform the processes described herein. For example, the application module 204 can be a module that integrates with the user application 202, e.g., a browser extension. The application module 204 can be written in or utilize a variety of programming languages, for example, JAVA, C++, Python code, Visual Basic, hypertext markup language (HTML), extensible markup language (XML), and the like to accommodate a variety of operating systems, computing system architectures, etc.

The application module 204 provides a user interface 206 for initiating the identification of potential references in the document 110. Additionally, the user interface 206 provides a display for outputting the results of the identification. The user interface 206 can be any type of command line and/or graphical user interface (GUI) that allows the user to interact with the application module 204 and the application 202. The application module 204 can be configured to provide, via the user interface 206, controls, forms, reports, etc., to allow the user of the application 202 to interact with the application module 204 and perform the processes described herein.

The application module 204 communicates with a search engine 208 coupled to a database 210. The application module 204 can be configured to extract the text of a document, such as text 112 of the document 110 described with reference to FIG. 1. Once extracted, the application module 204 can transmit the text of the document 110 to the search engine 208. The search engine 208 can be written in or utilize a variety of programming languages, such as JAVA, C++, Python code, Visual Basic, hypertext markup language (HTML), extensible markup language (XML), and the like to accommodate a variety of operating systems, computing system architectures, etc.

The search engine 208 includes a text processor 212. The text processor 212 can be configured to process the text of a document (e.g., the document 110). For example, the text processor 212 can be configured to parse the text of a document into syntactic structure of the text. In embodiments, the text processor 212 can be configured to utilize a customized natural language processor (NLP) that is tailored to the terminology and syntax of the technical field of the document 110. To properly parse the text into syntactic structures, the text processor 212 can utilize custom syntax data 214 to properly identify the syntactic structure of references by addressing the specific syntax of the technical field of the document 110. The custom syntax data 214 can include a syntactic role of one or more terms relative to a technical field associated with the potential biological product reference.

Once the candidate text phrases are parsed in the syntactic structures, the text processor 212 can tag the terms in the syntactic structures and score the syntactic structure based on the tags. To tag and score the syntactic structures, the text processor 212 can utilize term scoring dictionary 216. The text processor 212 can compare each of the terms in the syntactic structure to the term scoring dictionary 216 to locate a tag and assign the tag to each of the terms based on the comparison. The term scoring data dictionary 216 can include different vocabulary terms that are found in the references for the technical field and a relative confidence score for the tags. The term scoring dictionary 216 can include several lists or categories that are generated from multiple dictionaries and sources for the identifying and classifying terms that are relevant to the technical field of the document. For example, in the biological field, the term scoring dictionary 216 can include the lists generated from multiple dictionaries and sources in the biological field.

Once the references in the text of the document are identified, the text processor 212 transmits the references to a database (DB) interface 218. The DB interface 218 can be configured to generate one or more queries to search the database 210 based on the references identified in the text of the document. The DB interface 218 can search the database 210 using the queries to search the database 210 for products that are associated with the references. Once products are identified, the DB interface 218 can extract details of the identified products from the database 210.

Once products are identified and details extracted, the search engine 208 can return the results to the application module 204. The application module 204 can be configured to generate an interface for displaying the results to the user of the application 202. For example, the application module 204 can modify the text of the document 110 to replace or supplement the references in the document 110 with a link to the details of the product extracted from the database 210. As such, a user of the application 202 can identify the references and obtain the details of the product from the text of the document.

Figure 3:
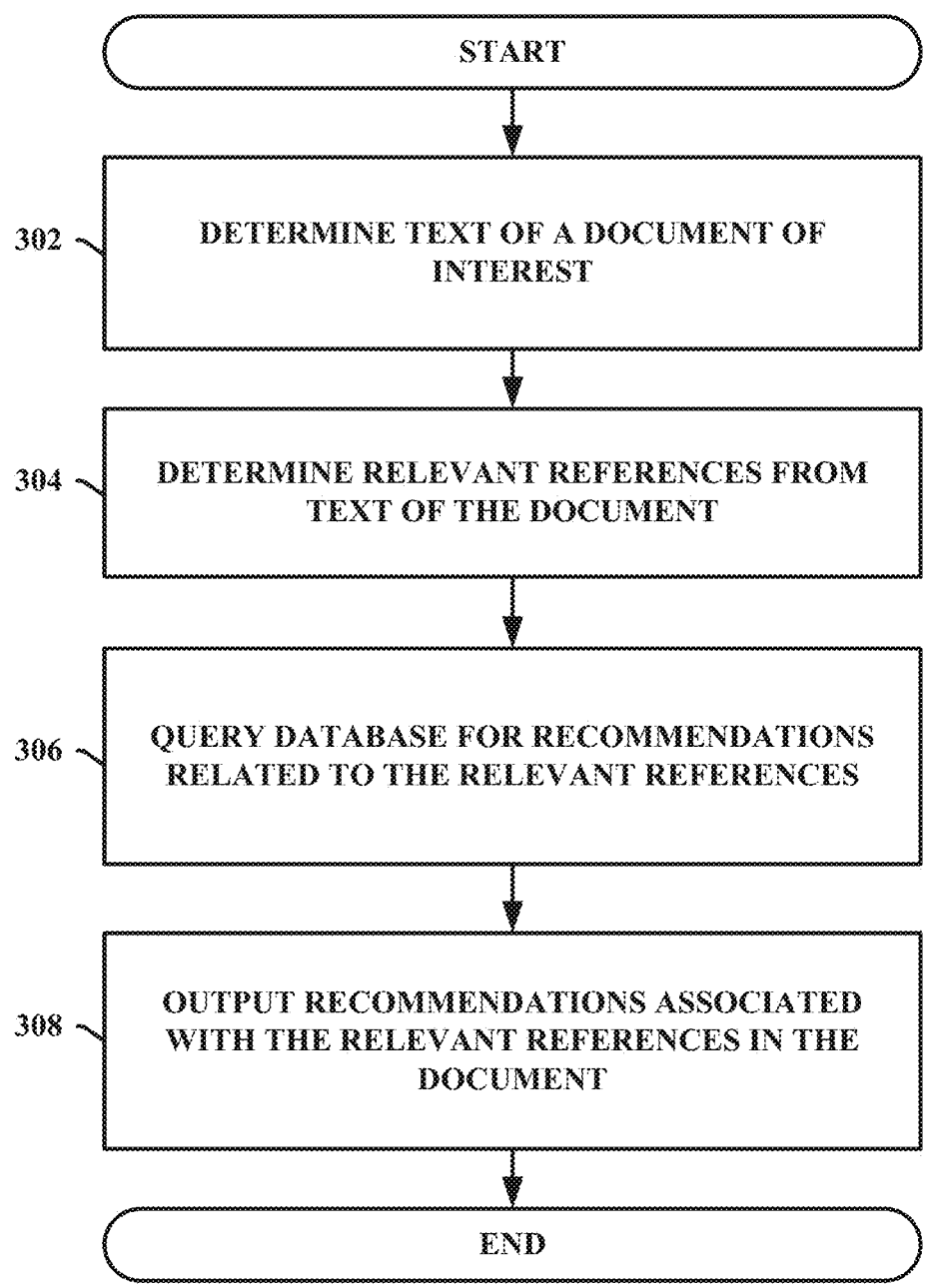
FIG. 3 depicts a workflow of a method for identifying references in a document, according to various exemplary embodiment of the present disclosure.

FIG. 3 depicts an exemplary parts of a workflow for a method for 300 for determining field specific terms and recommendations, according to embodiments of the present disclosure. Although FIG. 3 depicts steps performed in a particular order for purposes of illustration and discussion, the operations discussed herein are not limited to any particular order or arrangement. One skilled in the art, using the disclosures provided herein, would appreciate that various steps of the methods can be omitted, rearranged, combined, and/or adapted in various ways.

After the method 300 begins, in 302, the text of a document of interest can be determined. For example, referring to the example in FIG. 1, a document 110 can be provided at the computer device 102 for viewing, editing, or otherwise accessing, and the document can contain relevant references of which the identify is sought.

For example, referring to the example in FIG. 2, a search is initiated via the user interface 206. For example, references, such as biological references, in the document 110 may be desired to be extracted and related product recommendations identified. In response, the application module 204 can access the document 110 and extract the text from the document 110. Once extracted, the application module 204 can transmit the text to the search engine 208.

In 304, the relevant references can be determined from the text of the document. In embodiments, the text processor 212 can utilize a customized natural language processor (NLP) that is tailored to the terminology and syntax of the technical field of the document 110. To properly parse the text into syntactic structures, the text processor 212 can utilize custom syntax data 214 to properly identify the syntactic structure of references by addressing the specific syntax of the technical field of the document 110. The custom syntax data 214 can include a syntactic role of one or more terms relative to a technical field associated with the potential biological product reference.

After the candidate text phrases are parsed in the syntactic structures, the text processor 212 can tag the terms in the syntactic structures and score the syntactic structure based on the tags. To tag and score the syntactic structures, the text processor 212 can utilize term scoring dictionary 216. The term scoring data dictionary 216 can include different vocabulary terms that are found in the references for the technical field and a relative confidence score for the tags.

At 306, a database can be queried for recommendation related to the relevant references. In the exemplary embodiment of FIG. 2, the text processor 212 transmits the references to the DB interface 218. The DB interface 218 can be configured to generate one or more queries to search the database 210 based on the references identified in the text of the document. The DB interface 218 can search the database 210 using the queries to search the database 210 for products that are associated with the references. Once products are identified, the DB interface 218 can extract details of the identified products from the database 210.

At 308, the recommendations can be output with the relevant references in the documents. With reference to FIG. 2, the application module 204 can generate an interface for displaying the results to the user of the application 202. For example, the application module 204 can modify the text of the document 110 to replace or supplement the references in the document 110 with a link to the details of the product extracted from the database 210. As such, the application 202 can be used to identify the references and obtain the details of the product from the text of the document.

Figure 4:
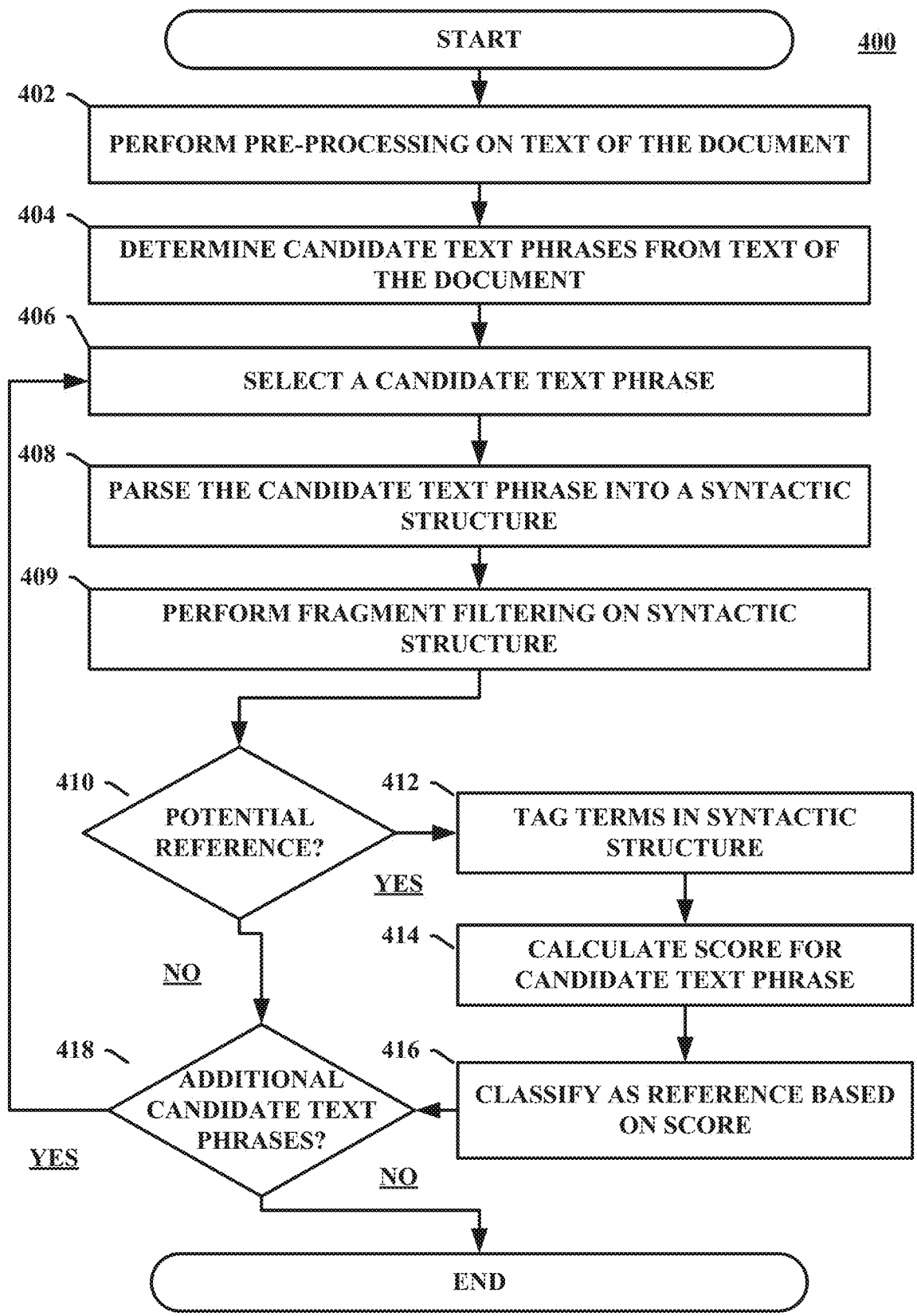
FIG. 4 depicts a workflow of a method for processing text of a document to identify references in a document, according to various exemplary embodiments of the present disclosure.

FIG. 4 depicts a workflow of a method 400 for determining references in text from a document, according to various exemplary embodiments of the present disclosure. Although FIG. 4 depicts steps in a particular order for purposes of illustration and discussion, the operations discussed herein are not limited to any particular order or arrangement. One skilled in the art, using the disclosures provided herein, would appreciate that various steps of the methods can be omitted, rearranged, combined, and/or adapted in various ways.

After text from a document is received, in 402, pre-processing is performed on the text of the document. For example, the search engine 208 can receive the text 112 of the document 110 from application module 204. The text processor 212 can perform pre-processing on the text to enhance parsing and the identification of candidate text phrases.

For example, if the document 110 is a web page, the text processor 212 can identify text blocks that end in a "newline" as text phrases. Likewise, for example, the text processor 212 can assume the text blocks were separate HTML elements on the web page and separate the text blocks as different sentences so the NLP parsing does not combine possible sentences. Also, for example, the text processor 212 can obfuscate various abbreviations (such as "Cat. #" and "et al.") so that the NLP parsing does not consider the abbreviations to be the ends of sentences. In other example, the test processor 212 can perform pre-processing on other types of documents such as portable document format (".pdf") to enhance parsing and the identification of candidate text phrases.

In 404, candidate text phrases can be determined from the text of the document. In embodiment, the text processor 212 can utilize a customized NLP to determine the candidate text phrases. The NLP can utilize a set of syntax models for sentence detection, parts-of-speech identification, and/or phrase chunking.

For example, using the set of syntax models, the text processor 212 can break down the entire text content into individual sentences. Then, the text processor 212 can break down each sentence into individual words/punctuation/etc. Once broken down, the text processor 212 can identify the part-of-speech (PoS), e.g., noun, verb, etc. for each term in the sentence.

At 406, a candidate text phrase can be selected. Once selected, in 408, the candidate text phrase can be parsed into a syntactic structure. For example, the text processor 212 can create a syntactic structure, e.g., "sentence tree," based on the structure of the sentence determined by the ordering of the identified parts-of-speech.

In certain embodiments, the NLP utilized by the text processor 212 can be customized to identify words that may have been misidentified by the PoS identification. For example, using the custom syntax data 214, the NLP can be tailored for the technical field related to the relevant references being identified. Once identified, the text processor 212 can assign a corrected identification to the misidentified words according to the correct PoS in the technical filed, i.e., the technical syntactic role. For instance, if the text processor 212 is identifying candidate biological references, e.g., antibodies, the NLP can be customized to look for terms that potentially could be misidentified by the NLP because the terms have specific meaning the biological field. For example, using the custom syntax data 214, the text processor 212 can identify terms such as symbols like # and % tagged as anything except a "SYMBOL" PoS, words that match known protein/gene names that are not tagged as a NOUN PoS, protein/antibody conjugation words that are not tagged as ADJECTIVE part-of-speech, conjunctions ('and' or 'or') not properly tagged as CONJUNCTION part-of-speech, and the like. By considering PoS specific to the technical field, the text processor can yield clean phrases for subsequent steps in the process.

At 409, fragment filtering is performed on the syntactic structure. In various exemplary embodiments, with reference to FIG. 2, the text processor 212 filters the syntactic structure according to a syntactic role of the one or more terms relative to a technical field associated with the potential references, for instance, the biological field or a more specialized subset thereof.

For example, after the NLP framework has created a syntactic structure, the text processor 212 can perform additional custom processing to collect the sentence phrases/fragments that are likely being treated as the subject or object of the sentence. In the processing, the text processor 212 can look for groups of words that the NLP has identified as "noun phrases," attach parenthesis phrases/fragments to the nearest noun phrase, and check for phrases/fragments that might contain multiple product references and defragment them.

For instance, the text processor 212, using the NLP, can select an example sentence "Primary antisera were as follows: BrdU (ab6326, Abcam), Ki67 (RM-9106-s1, Thermo Scientific), p-Histone-3 (06-570, Millipore) . . . " and break it down into the following syntactic structure based on the PoS identified in the previous steps:
1. Primary_ADJECTIVE antisera_NOUN
2. were_VERB as_PREPOSITION
3. follows_VERB
4. :_COLON
5. BrdU_NOUN (_PAREN ab6326_NOUN ,_COMMA Abcam_NOUN)_PAREN ,_COMMA Ki67_NOUN (_PAREN RM-9106-s1_NOUN ,_COMMA Thermo_NOUN Scientific_NOUN)_PAREN
6. ,_COMMA
7. p-Histone-3_NOUN (_PAREN 06-570_NUMBER
8. ,_COMMA Millipore_NOUN)_PAREN In this example, grouping 5 combined two valuable phrases across a comma that each contain an antibody reference. Highlighting the entire phrase would be incorrect. Moreover, it would be difficult to determine what antibody is being referenced when the entire phrase contains different protein/gene references. In grouping 7 and 8, a parenthesis grouping may have been broken out into two phrases due to the comma within the parenthesis. The contents within the parenthesis should be kept together within a phrase, and without that full information each separate phrase would not have enough information to correctly identify the antibody.

In this example, the text processor 212 filters the syntactic structure according to a syntactic role of the one or more terms relative to a technical field (e.g., the biological field or a more specialized subset thereof) associated with the potential antibody reference After filtering to detect and correct these incorrect phrase groupings, the text processor 212 can generate a syntactic structure:
1. Primary_ADJECTIVE antisera_NOUN
2. were_VERB as_PREPOSITION
3. follows_VERB
4. :_COLON
5. BrdU_NOUN (_PAREN ab6326_NOUN ,_COMMA Abcam_NOUN)_PAREN
6. ,_COMMA
7. Ki67_NOUN (_PAREN RM-9106-s1_NOUN ,_COMMA Thermo_NOUN Scientific_NOUN)_PAREN
8. ,_COMMA
9. p-Histone-3_NOUN (_PAREN 06-570_NUMBER ,_COMMA Millipore_NOUN)_PAREN At 410, it can be determined if the syntactic structure indicates a potential reference. In exemplary embodiments, the text processor 212 can examine the syntactic structure and determine if any of the terms could indicate a potential reference. For example, the text processor 212 can determine if the syntactic structure contains any terms that relate to the technical field, e.g., antibody reference. If the syntactic structure indicates a potential reference, in 412, the terms in the syntactic structure can be tagged. In embodiments, after the syntactic structure is determined to be a potential reference, the text processor 212 can scan the syntactic structure to determine if it contains terms that are part of a known "vocabulary" for the technical field and can tag the terms. The syntactic structure can be scanned for each vocabulary before scanning for the next vocabulary is performed.

For example, in the biological field example, referring again to FIG. 2, the text processor 212 can scan the syntactic structure based on the term scoring dictionary 216. The term scoring dictionary 216 can include a one or more hierarchical lists of vocabulary terms that are commonly found in references in the biological field, e.g., antibody terms. One example of a sequence in which the tagging processing occurs (some tags indicate that no other tag should be assigned to the same term) is as follows:
1. Clonality tagging
2. Host species tagging
3. Target species tagging
4. Company name tagging
5. Location tagging
6. Protein/gene/protein family tagging
7. Conjugation tagging
Only if steps 3, 4, or 6 identify a term in the fragment the following additional tagging is done
8. Clone ID tagging
9. Catalog Number tagging
10. Modification tagging
11. Isotype tagging Based on the example discussed above, the text processor 212 can tag the syntactic structure with additional tags (on top of the previous PoS identification) to the terms found in the term scoring dictionary 216 (shown in BOLD below).
1. Primary_ADJECTIVE:PRECEDENCE antisera_NOUN:ANTIBODY_INDICATOR were_VERB as_PREPOSITION
2. follows_VERB
3. :_COLON
4. BrdU_NOUN:NON_PROTEIN_TARGET (_PAREN ab6326_NOUN:CATALOG_NUMBER ,_COMMA Abcam_NOUN:COMPANY_NAME)_PAREN
5. ,_COMMA
6. Ki67_NOUN:PROTEIN (_PAREN RM-9106-s1_NOUN:CATALOG_NUMBER ,_COMMA
7. Thermo_NOUN:COMPANY_NAME Scientific_NOUN:COMPANY_NAME)_PAREN
8. ,_COMMA
9. p-Histone-3_NOUN:PROTEIN_FAMILY (_PAREN 06-570_NUMBER:CATALOG_NUMBER ,_COMMA Millipore_NOUN:COMPANY_NAME)_PAREN In various exemplary embodiments, the term scoring dictionary 216 can include several lists or categories that are generated from multiple dictionaries and sources for the identifying and classifying terms that are relevant to the technical field of the document. For example, in the biological field, the term scoring dictionary 216 can include the lists generated from multiple dictionaries and sources described below. The text processor 212 can compare each of the terms in the syntactic structure to the term scoring dictionary 216 to locate a tag and assign the tag to each of the terms based on the comparison.

Clonality Tagging

The term scoring dictionary 216 can include a hard-coded list of clonality terms (like 'monoclonal', 'mab', 'polyclonal', etc.). At 412, the text processor 212 can check each fragment term to determine whether it matches.

Host Species Tagging

The term scoring dictionary 216 can include different species found in antibody references. For example, the term scoring dictionary 216 can be generated using a product database, e.g., Thermo Fisher™ product database to include a set of possible Host (mouse, goat, etc.) terms. In 412, the text processor 212 can check each term from the fragment against the list.

Target Species Tagging

The term scoring dictionary 216 can include of different target species found in antibody references. For example, the term scoring dictionary 216 can be generated using a product database, e.g., Thermo Fisher™ product database to include, a set of possible Target (anti-mouse, anti-goat, etc.) terms. In 412, the text processor 212 can check each term from the fragment against the list.

Company Name Tagging

The term scoring dictionary 216 can include of different company names found in antibody references. For example, the term scoring dictionary 216 can be generated using an AntibodyRegistry data source, which is a unique list of vendors from across all antibody product entries (currently ~4.1 k vendor names). An additional list of ~200 manually curated common company synonyms can also be used to augment the set from AntibodyRegistry.

In 412, the text processor 212 can check each fragment for every known vendor name and synonym. Every word in the fragment that is part of a matching vendor name is tagged as being a company name vocabulary.

Protein/Gene/Protein Family Tagging

The term scoring dictionary 216 can include of different protein/gene/family names found in antibody references. For example, the term scoring dictionary 216 can be generated using the Uniprot data source. At 412, the text processor 212 can check each term in the fragment against the dictionary of "protein short name", "gene name" and "protein family" terms. In embodiments, the text processor 212 can utilize additional logic to avoid improperly tagging terms before checking the dictionary of "protein short name", "gene name" and "protein family" terms:

1. Ignores single character words.
2. Ignores all numeric words
3. Ignores a list of 'stopwords' like 'and', 'or', 'the', etc.
4. Ignores common month abbreviations (exact match)—'Jan', 'Feb', etc.
5. Strips common "anti-" prefix.
6. Strips known Modification and Isotype prefixes such as 'phospo-' and 'gamma'
7. Checks for the full phrase, as well as removing a trailing "0.1" or "-2" modifier in case like "PARM-1" or "PDX.1" would also check for "PARM1" or "PDX1".

Clone ID Tagging

The term scoring dictionary 216 can include different clone IDs found in antibody references. For example, the term scoring dictionary 216 can be generated using the AntibodyRegistry data source to obtain a unique list of clone IDs from across all antibody product entries (currently ~40 k values). At 412, the text processor 212 can check various regular expression patterns to attempt to identify the Clone ID based on the "Antibody Product Name" field from the data source. However, there may be inconsistent product naming conventions across the various biotechnology supply vendor. This may result in a number of "invalid" Clone ID being identified from the AntibodyRegistry data.

Catalog Number Tagging

The term scoring dictionary 216 can include of different catalog numbers found in antibody references. For example, the term scoring dictionary 216 can be generated using the AntibodyRegistry data source. In 412, the text processor 212 can check each term in the fragment in the SOLR index. The following additional logic is implemented before checking the data source:

1. Ignores single character words
2. Ignores a list of 'stopwords' like 'and', 'or', 'the', etc.
3. Removes leading catalog identifiers like 'Cat' and '#'.
4. Creates variations of the term to check
   a. Exact term and without "-" characters
   b. Upper Case and Lower Case The relevancy score from SOLR is checked for a set threshold before the term is considered a match.

Modification and Modification Type Tagging

The term scoring dictionary 216 can include different modification and modification types found in antibody references. For example, the term scoring dictionary 216 can be generated using a product database, e.g., the ThermoFisher™ product database, to obtain a set of modifications and modification types (~1300 modifications, ~5 modification types). In 412, the text processor 212 can check each term from the fragment is checked against the Modification Type and Modification values.

The following additional logic is implemented before checking the data source: the word is split into parts using any of the following characters Isotype Tagging The term scoring dictionary 216 can include different isotypes found in antibody references. For example, the term scoring dictionary 216 can be generated using a hard-coded list of isotype terms. At 412, the text processor 212 can check each fragment term to determine whether contains the isotype term.

The list of isotype terms (check codebase for exact list) are:

α, α1, α2, δ, ε, γ, γ1, γ2, γ3, γ4, μ, κ, λ iga, iga1, iga2, igd, ige, igg, igg1, igg2, igg2a, igg2a1, igg2b, igg2c, igg3, igg4, igm, kappa, lambda Conjugation Tagging The term scoring dictionary 216 can include different modification and modification types found in antibody references. For example, the term scoring dictionary 216 can be generated using a product database, e.g., the ThermoFisher™ product database, to obtain a set of conjugations (~100). At 412, the text processor 212 can check each term from the fragment against the list of Conjugation values.

At 414, a score for the candidate text phrase can be calculated, and at 416, the candidate text phrase can be classified as a reference based on the calculated score. In various exemplary embodiments, the text processor 212 can utilize the term scoring dictionary 216 to score each term in the syntactic structure based on a relative score for each tag. Based on the types of vocabularies identified on terms in a syntactic structure text processor 212 creates an overall weighted score for the candidate text phrase of the syntactic structure.

For example, the weights, in the term scoring dictionary 216, assigned to the presence of each vocabulary term can be determined through various discussions with subject matter experts. The magnitudes of the scores/weights are determined relative to each other indicate the strength of the presence of those vocabularies as indicators/features for determining if the phrase being evaluated is referencing an antibody product used in the article. The text processor 212 can consider only phrases scoring over a specific threshold as 'phrase matches' that should be highlighted/identified by the application module 204. The specific threshold value used by the text processor 212 can be determined through a manual evaluation of scores for various phrases within the test suite of research articles and set to a level that optimized the accuracy of reference identification while minimizing incorrect phrase identification (if too low of a threshold was used).

For example, for the example described above, the text processor 212 can store the tagged terms of the syntactic structure using the following scoring system:
ANTIBODY_INDICATO_SCORE=5 (Anywhere in sentence, not just phrase)
PRECENDENCE_SCORE=5 (Anywhere in sentence, not just phrase)
PROTEIN_GENE_TAG_SCORE=15;
MODIFICATION_TAG_SCORE=10;
ISOTYPE_TAG_SCORE=10;
CATALOG_NUMBER_TAG_SCORE=10;
CLONE_ID_TAG_SCORE=10;
CONJUGATION_TAG_SCORE=10;
CLONALITY_TAG_SCORE=10;
COMPANY_TAG_SCORE=10;
HOST_TAG_SCORE=10;
TARGET_SPECIES_TAG_SCORE=10;
MODIFICATION_TYPE_TAG_SCORE=5;

Then, the text processor 212 can calculate a sum of relative scores for each vocabulary found in candidate text phrase and calculate a total score by dividing the sum of the scores by a total possible score. For example, the text processor 212 can identify Isotype and Host vocabulary found in candidate text phrase that has Points for the phrase=20 and determine the Score=20 out of 100=0.20. The text processor 212 can check against a score threshold before considering the phrase a match. For example, if the threshold is 0.30, the previous example would not be considered a confident phrase match.

Using the example, the text processor 212 can determine a score as follows:
1. (Score 10/100=0.10) Primary_PRECENDENCE:5 antisera_ANTIBODY_INDICATOR:
2. (Score 0/100=0.0) were as
3. (Score 0/100=0.0) follows
4. (Score 0/100=0.0):
5. (Score 45/100=0.45) BrdU_NON_PROTEIN_TARGET:15 (ab6326_CATALOG_NUMBER:10, Abcam_COMPANY_NAME:10)
6. (Score 0/100=0.0),
7. (Score 45/100=0.45) Ki67_PROTEIN:15 (RM-9106-s1_CATALOG_NUMBER:10,
8. Thermo_COMPANY_NAME:10 Scientific_COMPANY_NAME:10) (Score 0/100=0.0),
9. (Score 45/100=0.45) p-Histone-3_PROTEIN_FAMILY:15 (06-570_CATALOG_NUMBER:10, Millipore_COMPANY_NAME:10)

Phrases 5, 7, and 9 have scores higher than the threshold of 0.30, resulting in them being highlighted by the tool.

At 418, it can be determined whether any additional candidate text phrases are available from the text. If additional candidate text phrases are available, method 400 can return to 406 and process the additional candidate text phrase. Otherwise, the method 400 can end.

Various aspects of the inventive method of using the novel natural language processing approaches and embodiments described herein contribute to the improved accuracy of the identified products in the document of interest and the relevancy of the subsequently recommended products as compared to conventional methods. These aspects of the natural language processing approach for candidate text phrases in the document of interest include but are not limited to: (1) utilizing custom syntax data to improve the proper identification of the syntactic structure of references by addressing the specific syntax of the relevant technical field for the document, (2) utilizing a term scoring dictionary to tag the syntactic structures, including the use of multiple dictionaries and other sources, for the improved identification and classification of terms that are relevant to the technical field for the document, (3) calculating a score for tagged terms based on a scoring system and use of a term scoring dictionary that assigns different weights to different types of vocabulary terms and the presence of those vocabulary terms in the candidate text phrase to improve the accuracy of identified products while also reducing the frequency of incorrect identifications through use of an appropriate score threshold against the sum output of the scoring system and the term scoring dictionary.

Various aspects of the novel natural language processing approaches and embodiments described herein are independent on a large amount of training runs or a large amount of training data and can therefore be implemented using only limited requirements on processing power and storage capacity. In one aspect, the novel natural language processing approaches described herein help improve the accuracy of the identified products as compared to conventional methods.

The improved accuracy of the novel natural language processing approaches and embodiments described herein may be expressed in terms of an improved accuracy in relation to a demand on a computer resource. In this regard an improved accuracy of the novel natural language processing approaches and embodiments described herein may be expressed or may become apparent as an improved accuracy, given a certain demand on a computer resource. On the other hand the improved accuracy may be expressed or may become apparent as a reduced demand on a computer resource required to achieve the same or similar accuracy.

Figure 5A:
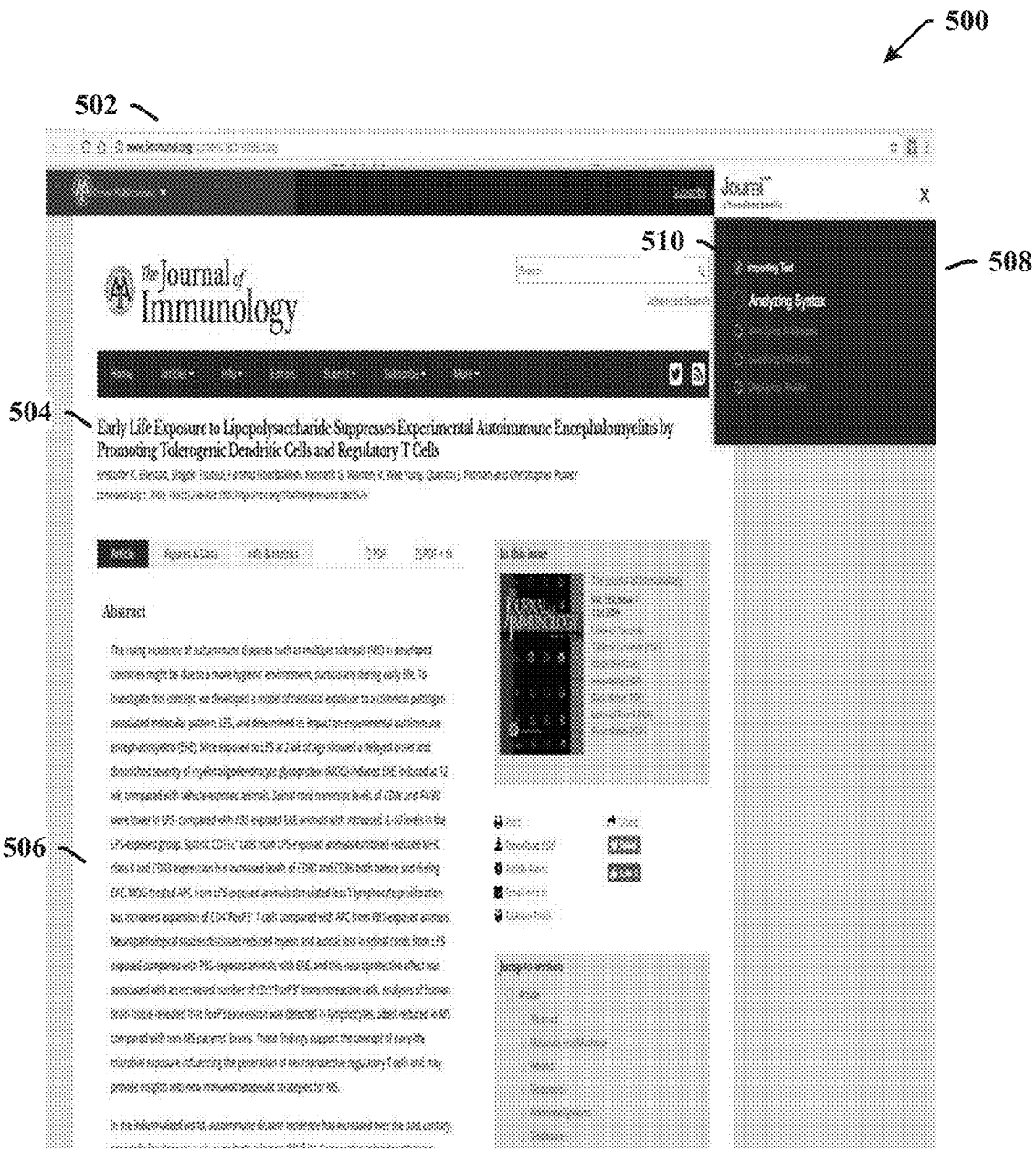
FIGS. 5A-5D depict interfaces for displaying product recommendations, according to various exemplary embodiments of the present disclosure.

As discussed above, once the references have been identified in a document and product recommendations determined, the product recommendations can be provided and/or stored at the computer device 102. FIGS. 5A-5D illustrate examples of the presentation of the product references. As illustrated in FIG. 5A, a user may access and view an electronic document using an application program 500. For example, the application program 500 can be a web browser. The user can navigate to a website 502 to view and access an electronic document 504, for example, a journal article. The electronic document 504 can include text 506 that is related to a technical field, for example, biology. For instance, the user may be viewing a scientific paper that concerns reference antibodies, and the user may desire to identify the antibody references in the document and products associated with the antibody references.

In embodiment, the application program 500 can include the application module 204 that generates an interface 508 for identifying references within the electronic document 504. As discussed above, a search can be initiated via the interface 508. For example, references, such as biological references, in the text 506 in the document 504 may be desired to be extracted and related product recommendations identified. In response, the application module 204 can access the document 504 and extract the text 506 from the document 504. Once extracted, the application module 204 can transmit the text to the search engine 208. As illustrated, the interface 508 can display a status 510 of the process of extracting the text 506 and processing the text 506 for searching.

Figure 5B:
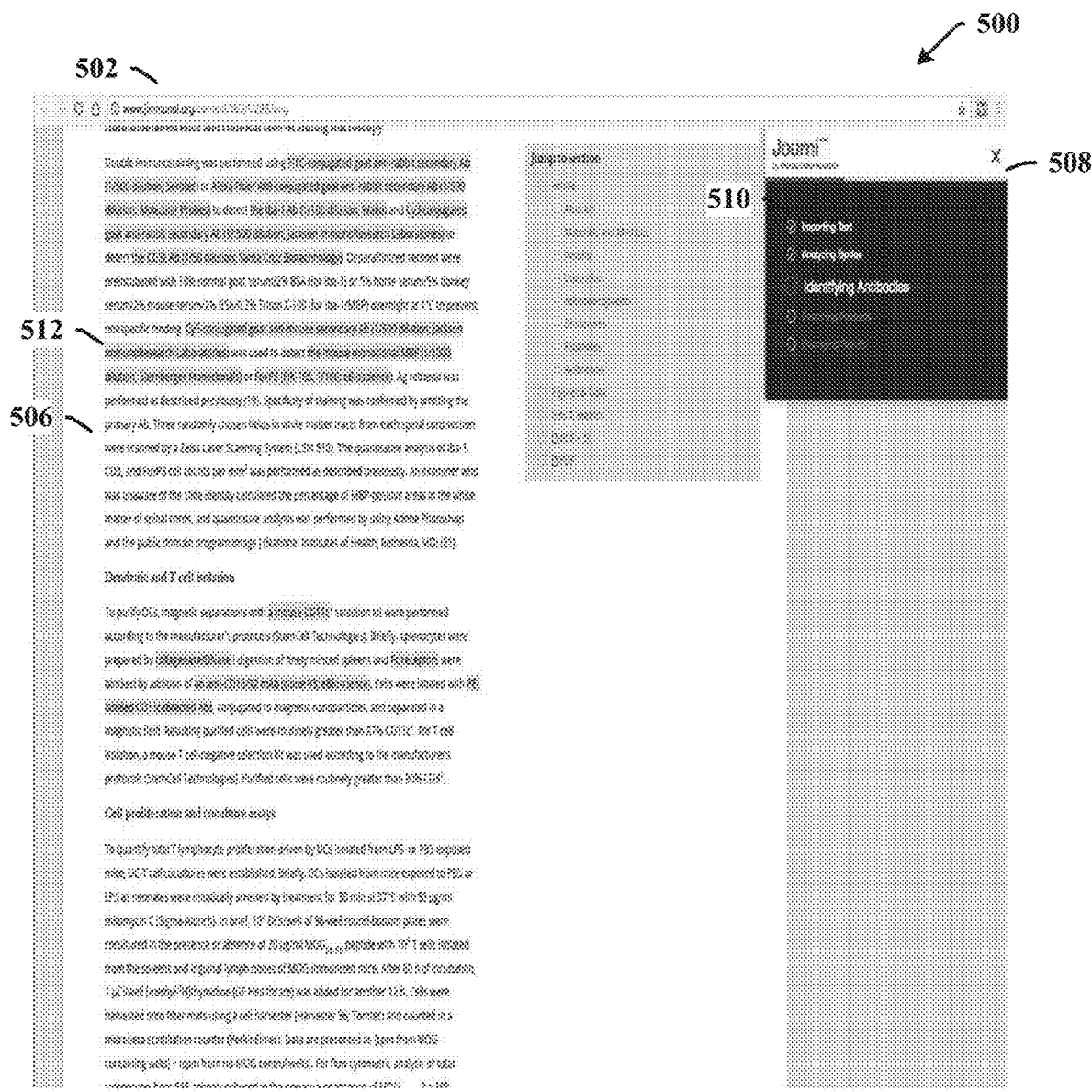

As illustrated in FIG. 5B, as the potential references are identified in the document 504, the application module 204 can annotate the potential references in the text 506 of the document 504. For example, the application module 204 can annotate the potential references, e.g., potential antibody references, with highlighting 512. In embodiments, the application module 204 can communicate with the search engine 208 during the method 400 described above in FIG. 4 to identify the potential references.

Figure 5C:
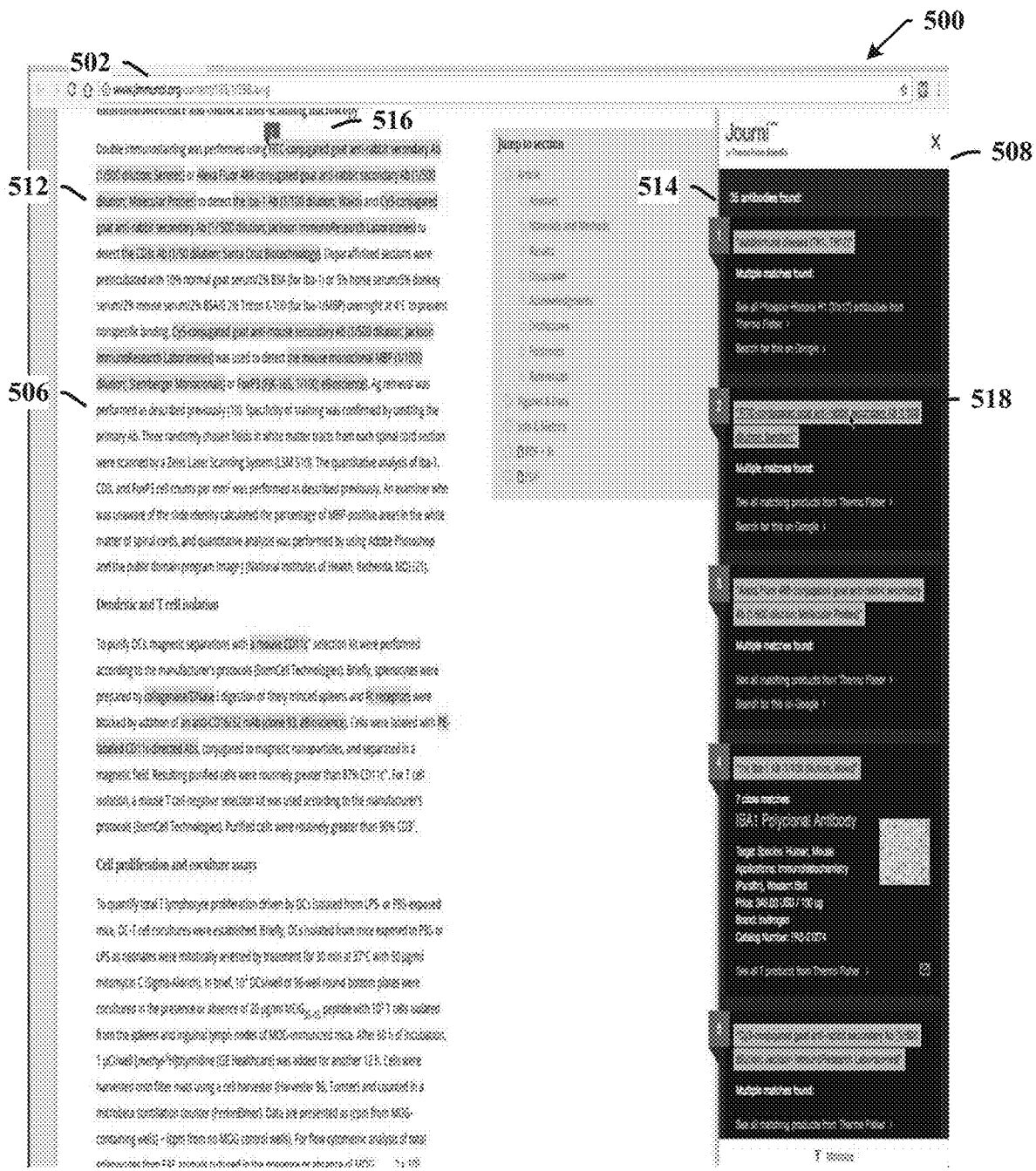

As illustrated in FIG. 5C, once the search engine 208 has identified the references and searched the database 210 for related products, for example using the method 400 described above, the product references can be returned to the application module 204. The application module 204 can generate and display a list 514 of the product references in the interface 508. For example, the list 514 can include an ordered and numbered list of the product references. In embodiments, each entry in the list 514 can include a description of the product reference, a link to the product, and other information associated with the product. The application module 204 can also further annotate the text 506 of the document 504 with a link 516 to the list 514. The link 516 can directly associate the product with the reference in the text 506.

Figure 5D:
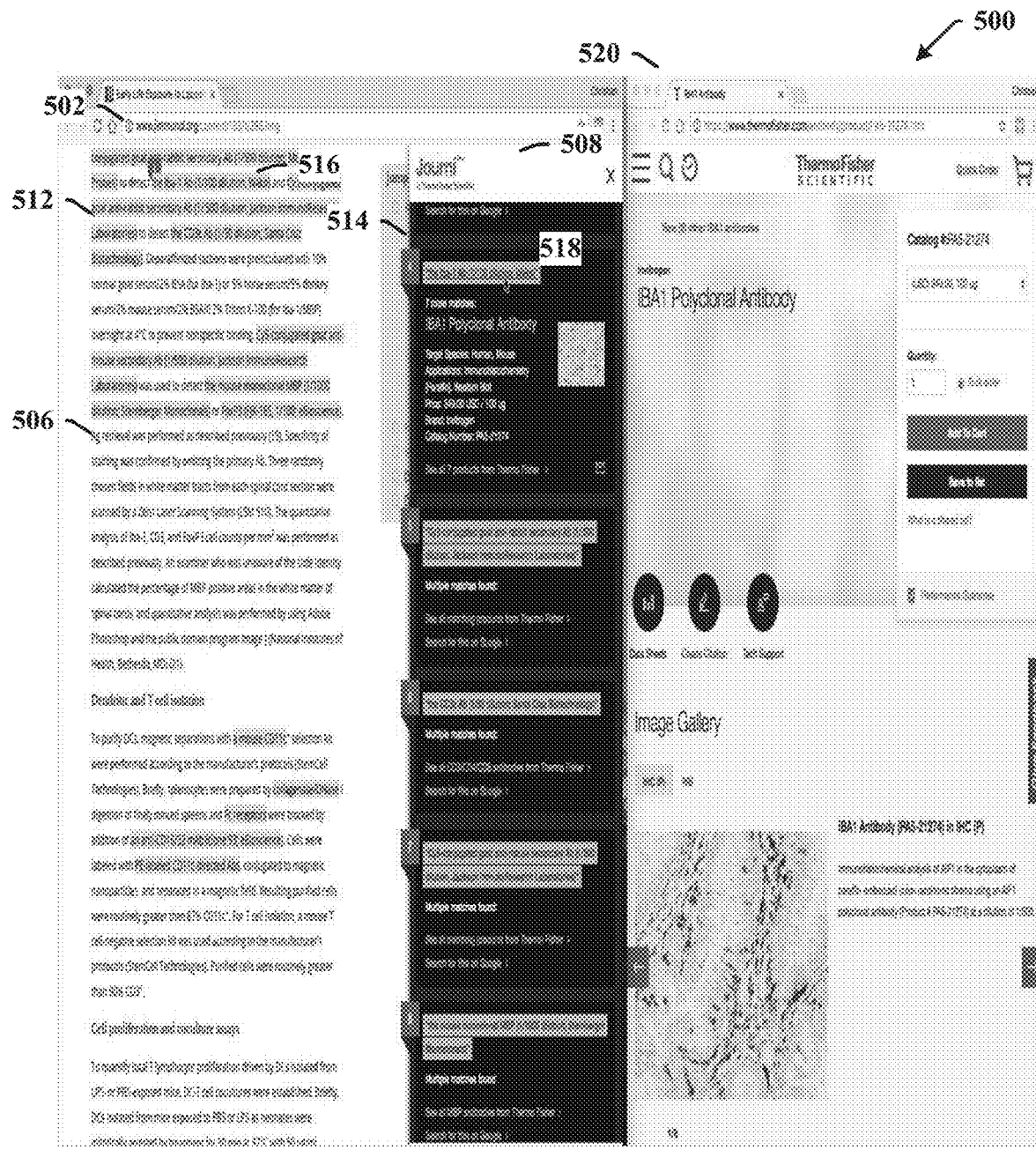

As illustrated in FIG. 5D, the list 514 can include an active link 518 to information on the product. If the active link 518 is selected by the user, the application module 204 can invoke an application to view the details of the product. For example, the active link 518 can be a link to a website associated with the product. For instance, when the active link 518 is selected, the application module 204 can invoke the application 520, e.g., a new web browser or window in a web browser, that navigates to a web page associated with the product. As such, the user can view details of the product and potentially purchase the product.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 6:
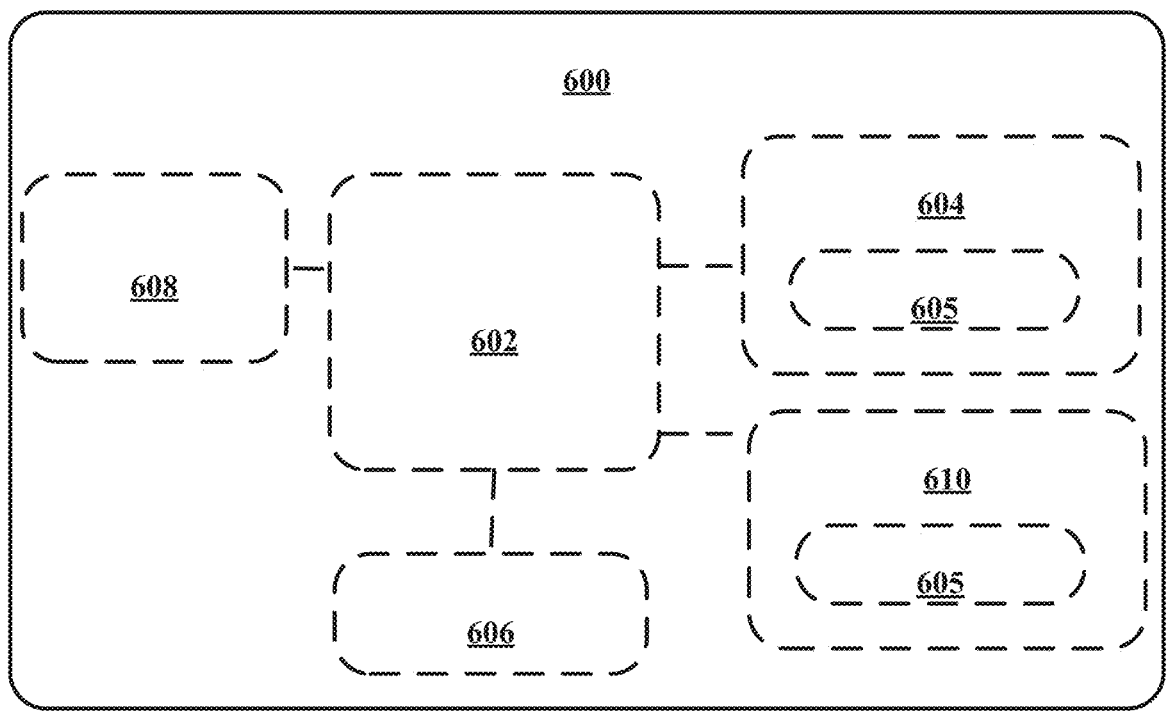
FIG. 6 depicts block diagram of a computer system, according to various exemplary embodiments of the present disclosure.

For example, FIG. 6 illustrates an example of a hardware configuration for a computer device 600, for example, the computer device 102, the server computers 104, or other computer systems. While FIG. 6 illustrates various components contained in the computer device 600, FIG. 6 illustrates one example of a computer device and additional components can be added and existing components can be removed.

The computer device 600 can be any type of computer device. As illustrated in FIG. 6, the computer device 600 can include one or more processors 602 of varying core configurations and clock frequencies. The computer device 600 can also include one or more memory devices 604 that serve as a main memory during the operation of the computer device 600. For example, during operation, a copy of the one or more software programs 605 that supports the processes and methods described above can be stored in the one or more memory devices 604. The computer device 600 can also include one or more peripheral interfaces 606, such as keyboards, mice, touchpads, computer screens, touchscreens, etc., for enabling human interaction with and manipulation of the computer device 600.

The computer device 600 can also include one or more network interfaces 608 for communicating via one or more networks, for example the network 106, such as Ethernet adapters, wireless transceivers, or serial network components, for communicating over wired or wireless media using protocols. The computer device 600 can also include one or more storage device 610 of varying physical dimensions and storage capacities, such as flash drives, hard drives, random access memory, etc., for storing data, such as images, files, and program instructions for execution by the one or more processors 602.

Additionally, the computer device 600 can include the one or more software programs 605 that enable the functionality of the processes and methods described above. The one or more software programs 605 can include instructions that cause the one or more processors 602 to perform the processes described herein. Copies of the one or more software programs 605 can be stored in the one or more memory devices 604 and/or on in the one or more storage devices 610. Likewise, the data utilized by one or more software programs 605 can be stored in the one or more memory devices 604 and/or on in the one or more storage devices 610.

The computer device 600 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network (SAN) familiar to those skilled in the art. Similarly, any necessary files for performing the functions attributed to the computers, servers, or other network devices may be stored locally and/or remotely, as appropriate.

In implementations, the components of the computer device 600 as described above need not be enclosed within a single enclosure or even located in close proximity to one another. Those skilled in the art will appreciate that the above-described componentry are examples only, as the computer device 600 can include any type of hardware componentry, including any necessary accompanying firmware or software, for performing the disclosed implementations. The computer device 600 can also be implemented in part or in whole by electronic circuit components or processors, such as application-specific integrated circuits (ASICs) or field-programmable gate arrays (FPGAs).

The examples of systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

While the present disclosure contains reference to exemplary embodiments thereof, those skilled in the art would be able to make various modifications to the described embodiments without departing from the scope and principles of operation. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

While exemplary embodiments have been shown and described herein, it will be obvious to those skilled in the art that such embodiments are provided by way of example only, and should be considered non-limiting. Numerous variations, changes, and substitutions will now occur to those skilled in the art without departing from the present disclosure. It should be understood that various alternatives to the embodiments described herein may be employed in practicing the scope of the present disclosure and claims. It is intended that the specification be considered as exemplary only, with the claims being entitled to their full breadth and scope, including equivalents.

Embodiments may be in accordance with any of the following numbered clauses:

1. A method of natural language processing and searching for identifying biological products in an electronic document, the method comprising:

extracting, from the electronic document, a candidate text phrase representing a potential biological product reference in the electronic document;

parsing the candidate text phrase into a syntactic structure including one or more terms, wherein the parsing filters the one or more terms in the syntactic structure according to a syntactic role of the one or more terms relative to a technical field associated with the potential biological product reference;

tagging each of the one or more terms in the syntactic structure with a vocabulary tag, wherein the vocabulary tag represents a technical meaning of a term in the potential biological product reference;

calculating a total score for the candidate text phrase based on relative tag scores associated with each vocabulary tag for the one or more terms, wherein the relative tag scores represent a relative confidence strength of each vocabulary tag in the potential biological product reference;

classifying the candidate text phrase as a biological product reference based on the total score exceeding a threshold; and searching a database for one or more product entries based on the biological product references.

2. The method of clause 1, the method further comprising: providing one or more product recommendations for the biological product reference based on the one or more product entries retrieved from the database.

3. The method of clause 2, wherein providing the one or more product recommendation comprises:

replacing or supplementing the biological product reference in the electronic document with a link to details of the product recommendation.

4. The method of clause 1, wherein the biological product reference comprises an antibody product reference.

5. The method of clause 1, wherein parsing the candidate text phrase into the syntactic structure comprises:

determining at least one of the one or more terms in the syntactic structure that are misidentified in the syntactic structure according to a conventional part-of-speech; and assigning a corrected identification to the at least one of the one or more terms in the syntactic structure according to a technical syntactic role of the at least one of the one or more terms in the potential biological product reference.

6. The method of clause 1, wherein calculating the total score for the candidate text phrase comprises:

calculating a sum of the relative tag scores associated with each vocabulary tag for the one or more terms; and calculating the total score by dividing the sum of the relative tag scores by a total possible score.

7. The method of clause 1, wherein tagging each of the one or more terms in the syntactic structure with the vocabulary tag comprises:

comparing each of the one or more terms in the syntactic structure to a term scoring dictionary associated with the technical field.

8. A non-transitory computer readable medium storing instructions for performing a method of natural language processing and searching for identifying biological products in an electronic document, the method comprising:

extracting, from the electronic document, a candidate text phrase representing a potential biological product reference in the electronic document;

parsing the candidate text phrase into a syntactic structure including one or more terms, wherein the parsing filters the one or more terms in the syntactic structure according to a syntactic role of the one or more terms relative to a technical field associated with the potential biological product reference;

tagging each of the one or more terms in the syntactic structure with a vocabulary tag, wherein the vocabulary tag represents a technical meaning of a term in the potential biological product reference;

calculating a total score for the candidate text phrase based on relative tag scores associated with each vocabulary tag for the one or more terms, wherein the relative tag score represents a relative confidence strength of each vocabulary tag in the potential biological product reference;

classifying the candidate text phrase as a biological product reference based on the total score exceeding a threshold; and searching a database for one or more product entries based on the biological product references.

9. The non-transitory computer readable medium of clause 8, the method further comprising:

providing one or more product recommendations for the biological product reference based on the one or more product entries retrieved from the database.

10. The non-transitory computer readable medium of clause 9, wherein providing the one or more product recommendation comprises:

replacing or supplementing the biological product reference in the electronic document with a link to details of the product recommendation.

11. The non-transitory computer readable medium of clause 8, wherein the biological product reference comprises an antibody product reference.

12. The non-transitory computer readable medium of clause 8, wherein parsing the candidate text phrase into the syntactic structure comprises:

determining at least one of the one or more terms in the syntactic structure that are misidentified in the syntactic structure according to a conventional part-of-speech; and assigning a corrected identification to the at least one of the one or more terms in the syntactic structure according to a technical syntactic role of the at least one of the one or more terms in the potential biological product reference.

13. The non-transitory computer readable medium of clause 8, wherein calculating the total score for the candidate text phrase comprises:

calculating a sum of the relative tag scores associated with each vocabulary tag for the one or more terms; and calculating the total score by dividing the sum of the relative tag scores by a total possible score.

14. The non-transitory computer readable medium of clause 8, wherein tagging each of the one or more terms in the syntactic structure with the vocabulary tag comprises:
comparing each of the one or more terms in the syntactic structure to a term scoring dictionary associated with the technical field.

15. A system comprising: one or more memory devices storing instructions; and one or more processors coupled to the one or more memory devices and configured to execute the instruction to perform a method of natural language processing and searching for identifying biological products in an electronic document, the method comprising:

extracting, from the electronic document, a candidate text phrase representing a potential biological product reference in the electronic document, parsing the candidate text phrase into a syntactic structure including one or more terms, wherein the parsing filters the one or more terms in the syntactic structure according to a syntactic role of the one or more terms relative to a technical field associated with the potential biological product reference, tagging each of the one or more terms in the syntactic structure with a vocabulary tag, wherein the vocabulary tag represents a technical meaning of a term in the potential biological product reference, calculating a total score for the candidate text phrase based on relative tag scores associated with each vocabulary tag for the one or more terms, wherein the relative tag scores represent a relative confidence strength of each vocabulary tag in the potential biological product reference, classifying the candidate text phrase as a biological product reference based on the total score exceeding a threshold, and searching a database for one or more product entries based on the biological product references.

16. The system of clause 15, the method further comprising:

providing one or more product recommendations for the biological product reference based on the one or more product entries retrieved from the database, wherein providing the one or more product recommendation, comprises:

replacing or supplementing the biological product reference in the electronic document with a link to details of the product recommendation.

17. The system of clause 16, wherein the biological product reference comprises an antibody product reference.

18. The system of clause 15, wherein parsing the candidate text phrase into the syntactic structure comprises:

determining at least one of the one or more terms in the syntactic structure that are misidentified in the syntactic structure according to a conventional part-of-speech; and assigning a corrected identification to the at least one of the one or more terms in the syntactic structure according to a technical syntactic role of the at least one of the one or more terms in the potential biological product reference.

19. The system of clause 15, wherein calculating the total score for the candidate text phrase comprises:

calculating a sum of the relative tag scores associated with each vocabulary tag for the one or more terms; and calculating the total score by dividing the sum of the relative tag scores by a total possible score.

20. The system of clause 15, wherein tagging each of the one or more terms in the syntactic structure with the vocabulary tag comprises:

comparing each of the one or more terms in the syntactic structure to a term scoring dictionary associated with the technical field.

What is claimed is:

1. A method of natural language processing and searching for identifying biological products in an electronic document, the method being performed using one or more processors and comprising:

extracting, from the electronic document, a candidate text phrase representing a potential biological product reference in the electronic document;

parsing the candidate text phrase into a syntactic structure including one or more terms, wherein the parsing filters the one or more terms in the syntactic structure according to a syntactic role of the one or more terms relative to a technical field associated with the potential biological product reference and detects and corrects an incorrect grouping of the one or more terms;

tagging each of the one or more terms in the syntactic structure with a vocabulary tag, wherein the vocabulary tag represents a technical meaning of a term in the potential biological product reference;

calculating a total score for the candidate text phrase based on relative tag scores associated with each vocabulary tag for the one or more terms, wherein the relative tag scores represent a relative confidence strength of each vocabulary tag in the potential biological product reference;

classifying the candidate text phrase as a biological product reference based on the total score exceeding a threshold;

searching a database for one or more product entries based on the biological product references; and displaying one or more links to the one or more products entries, the one or more links being selectable by a user.

2. The method of claim 1, wherein the one or more links represent
one or more product recommendations for the biological product reference, the one or more product recommendations being provided based on the one or more product entries retrieved from the database.

3. The method of claim 1, further comprising:
prior to displaying the one or more links, replacing or supplementing the biological product reference in the electronic document with a link of the one or more links to details of the product recommendation.

4. The method of claim 1, wherein the biological product reference comprises an antibody product reference.

5. The method of claim 1, wherein parsing the candidate text phrase into the syntactic structure comprises:
determining at least one of the one or more terms in the syntactic structure that are misidentified in the syntactic structure according to a conventional part-of-speech; and
assigning a corrected identification to the at least one of the one or more terms in the syntactic structure according to a technical syntactic role of the at least one of the one or more terms in the potential biological product reference.

6. The method of claim 1, wherein calculating the total score for the candidate text phrase comprises:
calculating a sum of the relative tag scores associated with each vocabulary tag for the one or more terms; and
calculating the total score by dividing the sum of the relative tag scores by a total possible score.

7. The method of claim 1, wherein tagging each of the one or more terms in the syntactic structure with the vocabulary tag comprises:
comparing each of the one or more terms in the syntactic structure to a term scoring dictionary associated with the technical field.

8. A non-transitory computer readable medium storing instructions for performing a method of natural language processing and searching for identifying biological products in an electronic document, the method being performed using one or more processors and comprising:
extracting, from the electronic document, a candidate text phrase representing a potential biological product reference in the electronic document;
parsing the candidate text phrase into a syntactic structure including one or more terms, wherein the parsing filters the one or more terms in the syntactic structure according to a syntactic role of the one or more terms relative to a technical field associated with the potential biological product reference and detects and corrects an incorrect grouping of the one or more terms;

tagging each of the one or more terms in the syntactic structure with a vocabulary tag, wherein the vocabulary tag represents a technical meaning of a term in the potential biological product reference;

calculating a total score for the candidate text phrase based on relative tag scores associated with each vocabulary tag for the one or more terms, wherein the relative tag score represents a relative confidence strength of each vocabulary tag in the potential biological product reference;

classifying the candidate text phrase as a biological product reference based on the total score exceeding a threshold;

searching a database for one or more product entries based on the biological product references; and displaying one or more links to the one or more products entries, the one or more links being selectable by a user.

9. The non-transitory computer readable medium of claim 8, wherein the one or more links represent
one or more product recommendations for the biological product reference, the one or more product recommendations being provided based on the one or more product entries retrieved from the database.

10. The non-transitory computer readable medium of claim 8, further comprising:
prior to displaying the one or more links, replacing or supplementing the biological product reference in the electronic document with a link of the one or more links to details of the product recommendation.

11. The non-transitory computer readable medium of claim 8, wherein the biological product reference comprises an antibody product reference.

12. The non-transitory computer readable medium of claim 8, wherein parsing the candidate text phrase into the syntactic structure comprises:
determining at least one of the one or more terms in the syntactic structure that are misidentified in the syntactic structure according to a conventional part-of-speech; and
assigning a corrected identification to the at least one of the one or more terms in the syntactic structure according to a technical syntactic role of the at least one of the one or more terms in the potential biological product reference.

13. The non-transitory computer readable medium of claim 8, wherein calculating the total score for the candidate text phrase comprises:
calculating a sum of the relative tag scores associated with each vocabulary tag for the one or more terms; and
calculating the total score by dividing the sum of the relative tag scores by a total possible score.

14. The non-transitory computer readable medium of claim 8, wherein tagging each of the one or more terms in the syntactic structure with the vocabulary tag comprises:
comparing each of the one or more terms in the syntactic structure to a term scoring dictionary associated with the technical field.

15. A system comprising:
one or more memory devices storing instructions; and
one or more processors coupled to the one or more memory devices and configured to execute the instruction to perform a method of natural language processing and searching for identifying biological products in an electronic document, the method comprising:
extracting, from the electronic document, a candidate text phrase representing a potential biological product reference in the electronic document, parsing the candidate text phrase into a syntactic structure including one or more terms, wherein the parsing filters the one or more terms in the syntactic structure according to a syntactic role of the one or more terms relative to a technical field associated with the potential biological product reference and detects and corrects an incorrect grouping of the one or more terms, tagging each of the one or more terms in the syntactic structure with a vocabulary tag, wherein the vocabulary tag represents a technical meaning of a term in the potential biological product reference, calculating a total score for the candidate text phrase based on relative tag scores associated with each vocabulary tag for the one or more terms, wherein the relative tag scores represent a relative confidence strength of each vocabulary tag in the potential biological product reference, classifying the candidate text phrase as a biological product reference based on the total score exceeding a threshold, searching a database for one or more product entries based on the biological product references, and displaying one or more links to the one or more products entries, the one or more links being selectable by a user.

16. The system of claim 15, wherein the one or more links represent one or more product recommendations for the biological product reference, the one or more product recommendations being provided based on the one or more product entries retrieved from the database, the method further comprising:

prior to displaying the one or more links, replacing or supplementing the biological product reference in the electronic document with a link to details of the product recommendation.

17. The system of claim 16, wherein the biological product reference comprises an antibody product reference.

18. The system of claim 15, wherein parsing the candidate text phrase into the syntactic structure comprises:

determining at least one of the one or more terms in the syntactic structure that are misidentified in the syntactic structure according to a conventional part-of-speech; and assigning a corrected identification to the at least one of the one or more terms in the syntactic structure according to a technical syntactic role of the at least one of the one or more terms in the potential biological product reference.

19. The system of claim 15, wherein calculating the total score for the candidate text phrase comprises:

calculating a sum of the relative tag scores associated with each vocabulary tag for the one or more terms; and calculating the total score by dividing the sum of the relative tag scores by a total possible score.

20. The system of claim 15, wherein tagging each of the one or more terms in the syntactic structure with the vocabulary tag comprises:

comparing each of the one or more terms in the syntactic structure to a term scoring dictionary associated with the technical field.

* * * * *